United States Patent
Tait

(10) Patent No.: US 11,524,616 B2
(45) Date of Patent: Dec. 13, 2022

(54) CONTROLLER AND MOUNT FOR A VEHICLE SEAT

(71) Applicant: Faurecia Automotive Seating, LLC, Auburn Hills, MI (US)

(72) Inventor: Shaun D. Tait, Auburn Hills, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 624 days.

(21) Appl. No.: 16/448,442

(22) Filed: Jun. 21, 2019

(65) Prior Publication Data

US 2020/0398720 A1 Dec. 24, 2020

(51) Int. Cl.
*B60N 2/75* (2018.01)
*B60R 11/00* (2006.01)
*B60N 2/02* (2006.01)

(52) U.S. Cl.
CPC ........... *B60N 2/797* (2018.02); *B60N 2/0228* (2013.01); *B60N 2/0232* (2013.01); *B60N 2/763* (2018.02); *B60R 11/00* (2013.01); *B60N 2002/0236* (2013.01); *B60R 2011/0014* (2013.01)

(58) Field of Classification Search
CPC .... B60N 2/797; B60N 2/0228; B60N 2/0232; B60N 2/763; B60N 2/75; B60N 2002/0236; B60R 11/0264; B60R 11/00; B60R 2011/0014

USPC .............................. 180/333, 315; 297/188.18
See application file for complete search history.

(56) References Cited

U.S. PATENT DOCUMENTS

| | | | |
|---|---|---|---|
| 6,264,272 B1 | 7/2001 | Jones | |
| 10,021,987 B2 | 7/2018 | Ravn | |
| 2004/0121819 A1 | 6/2004 | Vogel | |
| 2014/0125097 A1* | 5/2014 | Andreiu | B60R 11/0264 297/217.3 |
| 2021/0292997 A1* | 9/2021 | Adachi | B66C 13/56 |

FOREIGN PATENT DOCUMENTS

| | | |
|---|---|---|
| CN | 203252779 | 10/2013 |
| CN | 204037387 | 12/2014 |
| CN | 206623710 | 11/2017 |
| CN | 208101873 | 11/2018 |
| DE | 202014006649 | 11/2014 |
| EP | 2955051 | 12/2015 |
| KR | 20060004796 | 1/2006 |

* cited by examiner

*Primary Examiner* — Keith J Frisby
(74) *Attorney, Agent, or Firm* — Barnes & Thornburg LLP

(57) ABSTRACT

A vehicle seat includes a seat bottom, a seat back, and an armrest. A human-machine interface for controlling features of the vehicle seat or vehicle is coupled to the armrest.

16 Claims, 4 Drawing Sheets

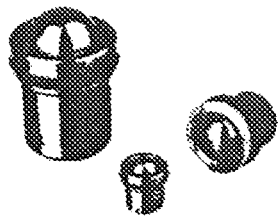
FIG. 7A  FIG. 7B
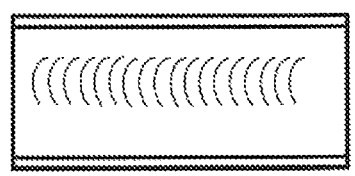
FIG. 8

CONTROLLER AND MOUNT FOR A VEHICLE SEAT

BACKGROUND

The present disclosure relates to a seat, and particularly to a vehicle seat. More particularly, the present disclosure relates to a vehicle seat mount and controller system used in the vehicle seat to control seat and vehicle features.

SUMMARY

According to the present disclosure, a vehicle seat includes a seat bottom, a seat back, and an armrest. A human-machine interface for controlling features of the vehicle seat or a vehicle is coupled to the armrest.

In illustrative embodiments, the human-machine interface is coupled to the armrest by a mount and controller system. The mount and controller system includes a retainer set with at least a pair of retainers and an adjustable handle. The human-machine interface includes an integrated electronic control unit and a communication device. The integrated electronic control unit is adapted to connect to a communications network through the communication device when the vehicle seat mount and controller system is installed on the armrest. In illustrative embodiments, the retainer set is configured to mount selectively the human-machine interface to the armrest when the handle is engaged.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 7A shows an example detent mechanism used as part of the present disclosure;

FIG. 7B shows an example detent ball bearing and spring mechanism as part of the present disclosure; and FIG. 8 shows an example detent assembly for securing the mounting and controller system onto a vehicle seat armrest.

DETAILED DESCRIPTION

Figure 1:
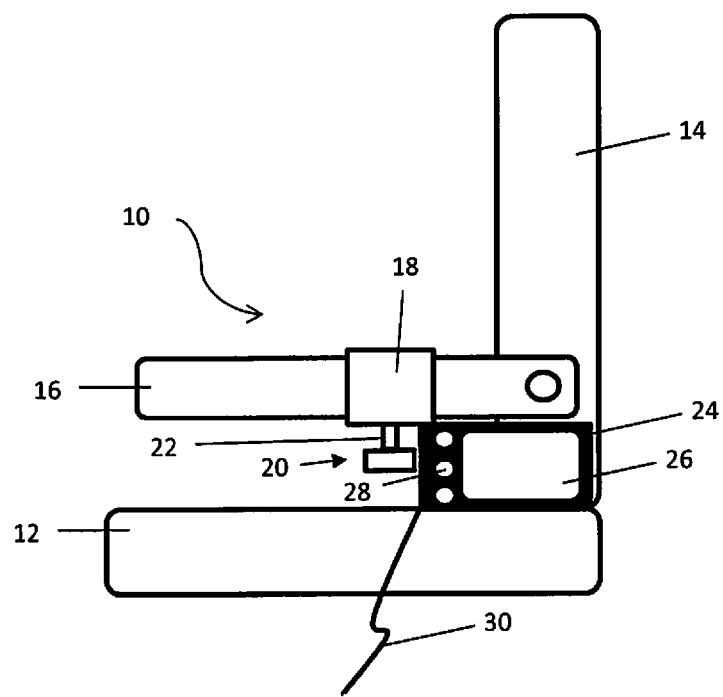
FIG. 1 is a diagrammatic view of an embodiment of the present disclosure showing the seat assembly, seat bottom, seat back, and armrest and a human-machine interface coupled to the armrest via a vehicle seat mount and controller in an installed configuration on the seat armrest.

As shown in FIG. 1, one embodiment of a vehicle seat mount and controller system 10 is mounted on a seat assembly with a seat bottom 12 and a seat back 14. The vehicle seat includes an armrest with a mount and controller system 10. The mount and controller system 10 includes a human-machine interface 24 with an integrated electronic control unit, a retainer set 18 such as a pair of retainers, an adjustable handle 20 with a shaft 22, and a wireless communication device 40 embedded into the electronic control unit of the human-machine interface 24.

A vehicle seat may have an armrest 16 on which the vehicle seat mount and controller system 10 may be installed. The electronic control unit within the human-machine interface 24 is adapted to connect to a power supply and at least one communications network through a wireless communication device 40 when the vehicle seat mount and controller system 10 is engaged with the armrest 16. The retainer set 18 is adapted to mount selectively the electronic control unit and human-machine interface 24 to the armrest 16 when the adjustable handle 20 is engaged. The human-machine interface 24 is connected to the retainer set 18 using an adjustable position component 42 as further illustrated, for example, in FIG. 5. In one example of the present disclosure, as shown in FIG. 1, the human-machine interface 24 is a display 26 with hard keys 28, a display 26 with soft keys 28, a touch screen 26 with electronic keys 28, or a combination thereof.

Figure 2:
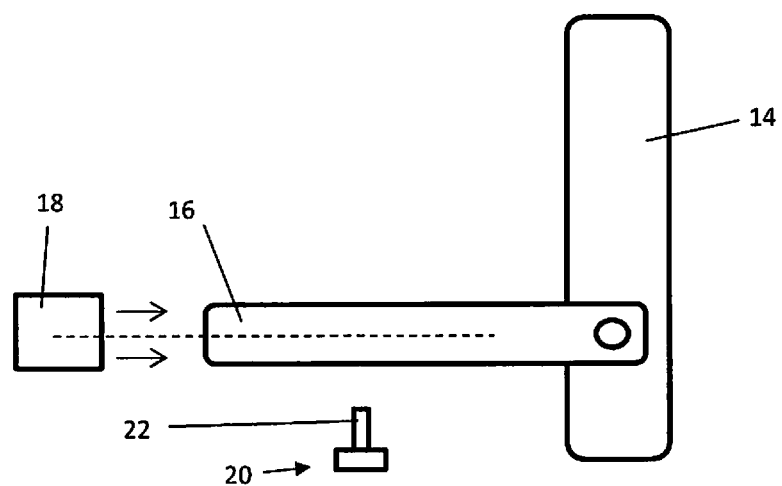
FIG. 2 is a diagrammatic view of a retainer set and an adjustable handle prior to installation on the vehicle seat armrest in a use position.

Referring to FIG. 2, the retainer set 18 as a single unit may be slid onto armrest 16 for installation. The retainer set 18 may have elliptical holes, as shown in FIG. 6B, tapped with threads for width adjustment to fit on a variety of armrest 16 sizes and shapes. Likewise, shaft 22 of adjustable handle 20 may include complimentary threads.

Figure 4:
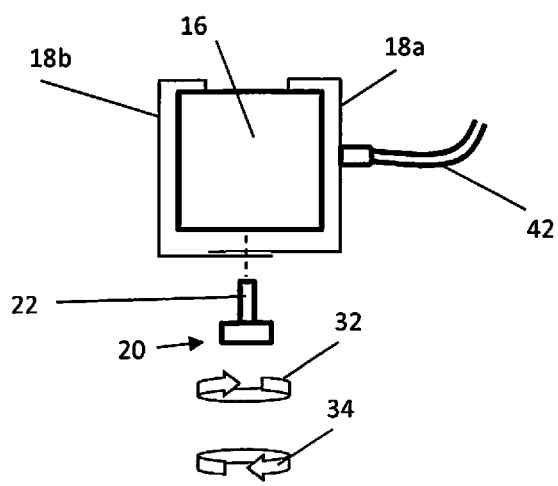
FIG. 4 is a diagrammatic front view of the armrest with the retainer set prior to installation of the adjustable handle through the retainer set and onto the armrest and suggesting that installation occurs through tightening of the adjustable handle by rotation in a clockwise direction while removal occurs through loosening of the adjustable handle by rotation in the counter-clockwise direction.
Figure 6A:
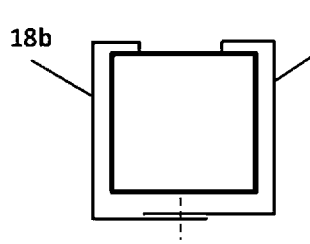
FIG. 6A shows the system of FIG. 4 without the adjustable position component and the handle.
Figure 6B:
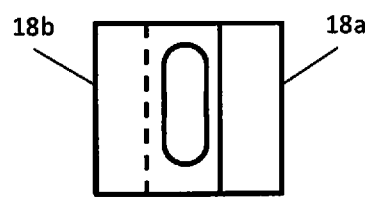
FIG. 6B shows an elliptical hole with threaded edges that may be used.

FIG. 6A shows the system in FIG. 4 without the adjustable position component 42 and adjustable handle 20. An elliptical hole with threaded edges may be used, as shown by FIG. 6B in a bottom view.

Figure 3:
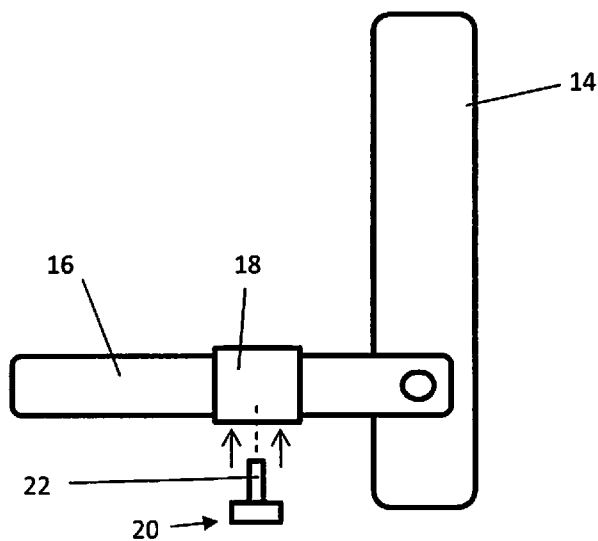
FIG. 3 is a diagrammatic view of the retainer set in position on the armrest prior to installation of the adjustable handle onto the armrest.

Referring to FIG. 3, the retainer set 18 is installed onto the armrest 16 and is ready for installation using the adjustable handle 20. The adjustable handle 20 is inserted through the retainer set 18 and moved in a first direction for tightening the retainer set 18 against the armrest 16.

Likewise, the adjustable handle 20 may be placed in the horizontal or vertical direction with respect to the seat back to fit a variety of sizes and shapes of armrests. A detent mechanism, such as the one shown in FIG. 7A or in FIG. 7B, may be used on the mount and controller system 10 to mount it to armrests of different sizes and shapes. The detent mechanism may include a ball bearing and spring. The adjustable handle 20 may include two components. For example, one component of the adjustable handle 20 may allow for horizontal adjustment while another may allow for vertical adjustment. An example detent assembly for the mount and controller system 10 for adjustment in the horizontal direction with respect to the seat back is shown in FIG. 8.

Referring to FIG. 4, a retainer set 18 preferably includes two corresponding brackets such as 18a and 18b. The brackets 18a and 18b may be loosely assembled prior to installing the retainer set 18 onto the armrest 16. Alternatively, bracket 18*a* may be placed on the armrest before or after 18*b* prior to inserting the adjustable handle 20. Rotating the adjustable handle 20 in a first direction 32, for example clockwise, will result in the shaft 22 being forced against the armrest 16 through the retainer 18. Rotating the adjustable handle 20 in a second direction 34 when the retainer set 18 is installed, for example counter-clockwise, will result in the shaft 22 being moved away from the armrest 16. Although a screw mechanism is shown as an example, any type of suitable tightening mechanism with a first direction 32 and a second direction 34 opposite the first direction 32 may be used.

Figure 5:
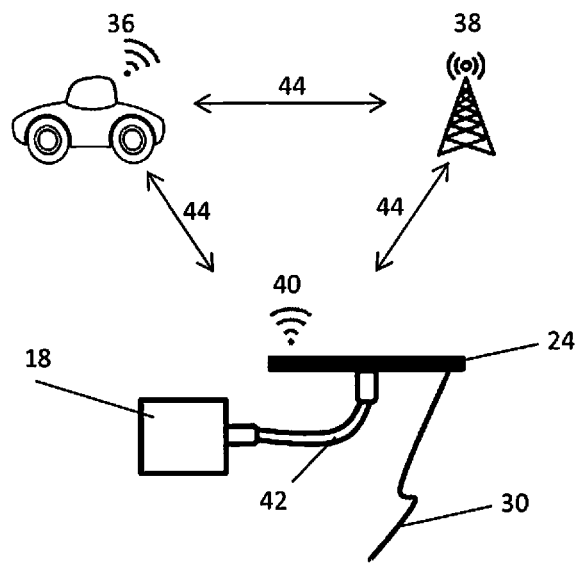
FIG. 5 is a diagrammatic view of a wireless communication system in relation to a wireless vehicle communication system and a communication infrastructure showing that a flexible gooseneck may be used as a connection for the human-machine interface to the retainer set.

Referring to FIG. 5, retainer set 18 is connected to the human-machine interface 24 using an adjustable position component 42, such as a flexible gooseneck. The adjustable position component 42 may have a number of degrees of freedom, allowing the human-machine interface 24 to be faced in any direction in any manner with respect to the armrest.

Depending on the vehicle application of the vehicle seat mount and controller system 10, the adjustable position component 42 may have rigid arms at either end. The properties of the adjustable position component 42 will depend on the vehicle application. For example, for commercial vehicles or heavy duty trucks, a larger minimum bend radius and higher load capacity may be used. Conversely, compact vehicle applications may use a much smaller minimum bend radius and lower load capacity for supporting the human-machine interface 24. In one example, a length of the adjustable position component 42 will be about 9 inches for light duty applications to about 24 inches. The load support will range from about one-eighth of a pound to about five pounds to support a relatively small or large human-machine interface 24. The minimum bend radius achieved may be about 1.5 inches to about 3 inches, again depending on the vehicle application of the present disclosure.

Referring again to FIGS. 4 and 5, retainer set 18 may include a power supply (not shown). The power supply may be conventional or rechargeable batteries or a separate power pack attached to 18*a* or 18*b*. The electrical connection 30 may be integrated into the adjustable position component 42. For example, fishing a wire through a flexible, hollow tube defined by the exterior wall of 42. In various embodiments, the batteries or power pack may have a predefined location on the retainer set 18 for installation and removal. Other embodiments may include a power supply that is adapted to plug into a vehicle electrical socket, such as a cigarette lighter socket or power plug outlet, via electrical connection 30. For example, the electrical connection 30 may be a wired connection.

Embodiments may include the retainer set 18 made of a suitable metal or plastic material. The mount and controller system 10 allows an occupant of a vehicle seat to control seat features and/or vehicle features. The seat features may be controlled from the seat itself or from a switch or controller not located on the seat bottom 12 or seat back 14. In some embodiments, the mount and controller system 10 allows an occupant of a vehicle seat to control vehicle features that are included on the steering wheel or instrument panel. The wireless communication device 40 may allow the mount and controller system 10 to exchange and process data via wireless communications 44 for control over seat and vehicle features. A wireless telecommunications system 38 may also be included in the information exchange loop for cloud data preferences, vehicle-to-vehicle, or vehicle-to-infrastructure (V2X) communications.

Reference is hereby made to U.S. application Ser. No. 15/863,129, filed Jan. 1, 2018 and entitled SEAT COVER for disclosure relating to a seat cover with advanced functionality and a control system that may be used with the present disclosure, which application is hereby incorporated in its entirety herein.

The retainer set 18 may form a square or rectangular cross-sectional profile when it is assembled on the armrest 16. The retainer set 18 may optionally have a circular or oval cross-sectional profile when it is assembled on the armrest 16.

The adjustable handle 20 may include a shaft attached to a knob or thumb screw. The adjustable handle 20 may also pass through an interconnection when installed or removed from the armrest 16. The interconnection may include a bushing, damper, or other component to ease installation or alignment of the mount and controller system 10 onto the armrest 16. When the mount and controller system 10 is installed, the adjustable handle 20 has an internal end that directly contacts the armrest and the external end that is accessible outside the retainer set 18.

The method of installing the vehicle seat mount and controller system 10 includes sliding the retainer set 18, which includes the human-machine interface 24, onto the armrest 16 to at least partially surround the armrest 16 within the brackets defined by 18*a* and 18*b*, and rotating the adjustable handle 20 in a first direction 32 through the retainer set 18 to mount the mount and controller system 10 onto the armrest 16 with holding force applied from a shaft 22 of the adjustable handle 20. The adjustable handle 20 is rotated clockwise in a first direction 32 for increasing the holding force and counter-clockwise in a second, opposite direction 34 for decreasing the holding force.

The invention claimed is:

1. A mount and controller system for use with a vehicle seat, the mount and controller system comprising
   a human-machine interface including an integrated electronic control unit and a wireless communication device with an electrical connection to a power supply,
   a retainer set with at least a pair of retainers, and
   an adjustable handle,
   wherein the integrated electronic control unit is adapted to connect to a communications network through the wireless communication device when the vehicle seat mount and controller system is installed on an armrest and
   wherein the retainer set is configured to mount selectively the human-machine interface to the armrest when the handle is engaged.

2. The mount and controller system of claim 1, wherein the retainer set forms a square or rectangular cross-sectional profile when the retainer set is installed on the armrest.

3. The mount and controller system of claim 1, wherein the retainer set forms a circular or oval cross-sectional profile when the retainer set is installed on the armrest.

4. The mount and controller system of claim 1, wherein the handle includes an internal end and an external end with respect to the retainer set when the retainer set is installed on the armrest.

5. The mount and controller system of claim 4, wherein the internal end of the handle directly contacts the armrest and the external end of the handle is accessible outside the retainer set.

6. The mount and controller system of claim 1, further comprising an interconnection between the retainer set and the handle to provide stability and/or alignment with the armrest.

7. The mount and controller system of claim 5, wherein the handle is configured to rotate in a first direction to increase a holding force of the retainer set and handle against the armrest and a second, opposite, direction to decrease the holding force of the retainer set and handle against the armrest.

8. The mount and controller system of claim 1, wherein the retainer set is made from at least one of a metal or a plastic material.

9. The mount and controller system of claim 1, wherein the handle includes a shaft coupled to a knob or a thumb screw.

10. The mount and controller system of claim 1, wherein the retainer set forms a slide-on, C-shaped bracket when the retainers are assembled loosely with the handle.

11. The mount and controller system of claim 1, wherein the human-machine interface is coupled to at least one of the retainers.

12. The mount and controller system of claim 1, wherein the human-machine interface is a display with hard keys, a display with soft keys, a touch screen display with electronic keys, or a combination thereof.

13. The mount and controller system of claim 12, wherein the human-machine interface adjusts electronically seat controls, steering wheel controls, or vehicle instrument panel controls using at least one of the hard keys, soft keys, electronic keys, or combinations thereof.

14. The mount and controller system of claim 1, wherein the power supply is provided through a vehicle power outlet through the electrical connection.

15. The mount and controller system of claim 14, wherein the electrical connection is a wired connection.

16. The mount and controller system of claim 1, wherein at least one of the retainers includes an integrated power supply unit.

* * * * *